(12) United States Patent
Schubert et al.

(10) Patent No.: US 10,532,953 B2
(45) Date of Patent: Jan. 14, 2020

(54) PRECURSOR MATERIAL FOR ADDITIVE MANUFACTURING OF LOW-DENSITY, HIGH-POROSITY CERAMIC PARTS AND METHODS OF PRODUCING THE SAME

(71) Applicant: The Boeing Company, Chicago, IL (US)

(72) Inventors: Randall Schubert, Los Angeles, CA (US); Brennan Yahata, Los Angeles, CA (US); Joanna Kolodziejska, Arcadia, CA (US); Stephen E. Lehman, Golden Eagle, IL (US); Vann Heng, Buena Park, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/013,688

(22) Filed: Jun. 20, 2018

(65) Prior Publication Data
US 2018/0305262 A1    Oct. 25, 2018

Related U.S. Application Data

(62) Division of application No. 15/332,683, filed on Oct. 24, 2016, now Pat. No. 10,029,949.

(51) Int. Cl.
*C04B 35/80* (2006.01)
*B33Y 40/00* (2015.01)
(Continued)

(52) U.S. Cl.
CPC .............. *C04B 35/80* (2013.01); *B33Y 40/00* (2014.12); *B33Y 70/00* (2014.12); *B33Y 80/00* (2014.12);
(Continued)

(58) Field of Classification Search
CPC ... C04B 2111/00793; C04B 2111/0081; C04B 2111/00853; C04B 2235/3217;
(Continued)

(56) References Cited

U.S. PATENT DOCUMENTS 5,290,350 A * 3/1994 Besnard ................ C04B 35/803
106/205.01
6,416,850 B1 * 7/2002 Bredt ........................ B28B 1/00
428/297.4
(Continued)

FOREIGN PATENT DOCUMENTS

WO    WO 2008/106518    9/2008

OTHER PUBLICATIONS

European Patent Office, "Communication pursuant to Article 94(3) EPC," App. No. 17 197 507.1 (dated Nov. 30, 2018).

*Primary Examiner* — Noah S Wiese
(74) *Attorney, Agent, or Firm* — Walters & Wasylyna LLC (57) ABSTRACT

A precursor material is provided for additive manufacturing of a low-density, high-porosity ceramic part. The precursor material includes a body of refractory fibers and a binder in admixture with the body of refractory fibers. The precursor material further includes a viscosity control additive in admixture with the binder and the body of refractory fibers to provide an overall mixture with a viscosity between about 0.3 centipoise and about 150,000 centipoise.

20 Claims, 5 Drawing Sheets

(51) Int. Cl.
  *B33Y 70/00*   (2015.01)
  *B33Y 80/00*   (2015.01)
  *C04B 35/626*  (2006.01)
  *C04B 35/632*  (2006.01)
  *C04B 35/638*  (2006.01)
  *C04B 35/66*   (2006.01)
  *F16L 59/02*   (2006.01)
  *B28B 1/00*    (2006.01)

(52) U.S. Cl.
  CPC ........ *C04B 35/6264* (2013.01); *C04B 35/632* (2013.01); *C04B 35/638* (2013.01); *C04B 35/66* (2013.01); *F16L 59/028* (2013.01); *B28B 1/001* (2013.01); *C04B 2235/5224* (2013.01); *C04B 2235/5228* (2013.01); *C04B 2235/5232* (2013.01); *C04B 2235/6026* (2013.01); *C04B 2235/77* (2013.01)

(58) Field of Classification Search
  CPC ...... C04B 2235/3826; C04B 2235/402; C04B 2235/5224; C04B 2235/5409; C04B 2235/5436; C04B 2235/6027; C04B 2235/656; C04B 2235/77; C04B 2237/343; C04B 2237/365; C04B 2237/58
  See application file for complete search history.

(56) References Cited

U.S. PATENT DOCUMENTS

| | | | | |
|---|---|---|---|---|
| 6,716,782 | B2* | 4/2004 | Heng | C04B 30/02 264/640 |
| 6,987,076 | B1* | 1/2006 | Jubb | C04B 28/24 501/35 |
| 7,628,951 | B1* | 12/2009 | Akash | B32B 18/00 264/603 |
| 7,807,077 | B2* | 10/2010 | Hochsmann | B33Y 10/00 264/113 |
| 7,927,538 | B2 | 4/2011 | Moszner et al. | |
| 2002/0149128 | A1 | 10/2002 | DiChiara, Jr. | |
| 2004/0234436 | A1* | 11/2004 | Howorth | C04B 30/02 422/245.1 |
| 2013/0225391 | A1* | 8/2013 | Iwata | B22D 35/00 501/95.2 |
| 2016/0051941 | A1* | 2/2016 | Li | B01D 53/228 96/4 |

* cited by examiner

PRINTING DIRECTION

FIG. 3

PRINTING DIRECTION

FIG. 4

CASTING DIRECTION

FIG. 5
(PRIOR ART)

CASTING DIRECTION

PRECURSOR MATERIAL FOR ADDITIVE MANUFACTURING OF LOW-DENSITY, HIGH-POROSITY CERAMIC PARTS AND METHODS OF PRODUCING THE SAME

PRIORITY

This application is a divisional of U.S. Ser. No. 15/332,683 filed on Oct. 24, 2016.

FIELD

The present application relates to additive manufacturing, and is particularly directed to a precursor material for additive manufacturing of low-density, high-porosity ceramic parts and methods of producing the same.

BACKGROUND

Precursor materials used in additive manufacturing (i.e., three-dimensional printing) of low-density, high-porosity ceramic parts need to be deposited in a uniform, consistent, and predictable manner. Known ceramic precursor materials are often in heterogeneous suspensions that can be difficult to deposit in a controlled way. This difficulty is due to rheological properties of a suspension, such as viscosity and shear-thinning properties, which are relevant to extrusion of the suspension through a nozzle during the additive manufacturing process.

The rheological properties of the suspension can be changed to make the suspension easier to deposit in a controlled way during the additive manufacturing process. However, such changes in the rheological properties of the suspension can also interfere with a sintering process and, therefore, degrade ultimate properties of the manufactured ceramic part. It would be desirable to provide ceramic precursor materials that overcome drawbacks of known ceramic precursor materials.

SUMMARY

In one aspect, a precursor material is provided for additive manufacturing of a low-density, high-porosity ceramic part. The precursor material comprises a body of refractory fibers and a binder in admixture with the body of refractory fibers. The precursor material further comprises a viscosity control additive in admixture with the binder and the body of refractory fibers to provide an overall mixture with a viscosity between about 0.3 centipoise and about 150,000 centipoise. The overall mixture can be extruded through a nozzle to manufacture the low-density, high porosity ceramic part.

In another aspect, a method is provided of producing a precursor material for additive manufacturing of a low-density, high-porosity ceramic part. The method comprises obtaining a refractory fiber slurry, and adding a viscosity control additive to the slurry to provide the slurry with a viscosity that is suitable for extrusion through a nozzle to manufacture a low-density, high-porosity ceramic part.

In yet another aspect, a method is provided of producing a precursor material for additive manufacturing of a low-density, high-porosity ceramic part. The method comprises obtaining an aqueous ceramic fiber slurry containing a body of ceramic fibers including about 50 weight percent to about 80 weight percent silica fibers and about 20 weight percent to about 50 weight percent alumina fibers, and adding xanthan gum that has a weight between about 0.25 percent and about 2.5 percent of a weight of the binder and the body of ceramic fibers before the aqueous ceramic fiber slurry is heated to provide the slurry with a viscosity that is suitable for extrusion through a nozzle to manufacture a low-density, high-porosity ceramic part.

Other aspects will become apparent from the following detailed description, the accompanying drawings and the appended claims.

DETAILED DESCRIPTION

The present disclosure is directed to a precursor material for additive manufacturing of low-density, high-porosity ceramic parts and methods of producing the same. The specific construction of the ceramic precursor material and the industry in which the ceramic precursor material is implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a precursor material for additive manufacturing of low-density, high-porosity ceramic parts and methods of producing the same, which may be implemented by an original equipment manufacturer (OEM) for manufacturing low-density, high-porosity ceramic insulation parts in compliance with military and space regulations.

Figure 1:
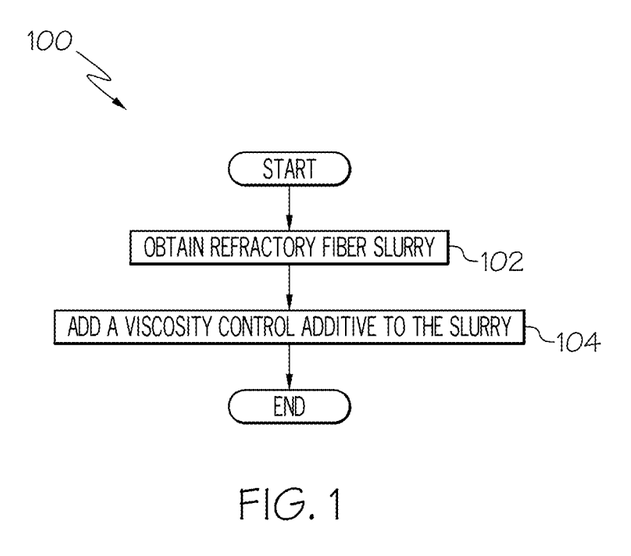
FIG. 1 is a flow diagram depicting a method of producing a ceramic precursor material in accordance with an example embodiment for additive manufacturing of a low-density, high-porosity ceramic part.

Referring to FIG. 1, flow diagram 100 depicts an example method of producing a precursor material for additive manufacturing of a low-density, high-porosity ceramic part in accordance with an embodiment. In block 102, a refractory fiber slurry is obtained. The process then proceeds to block 104. In block 104, a viscosity control additive is added to the refractory fiber slurry. The viscosity control additive provides the slurry with a viscosity that is suitable for extrusion through a nozzle to manufacture a low-density, high-porosity ceramic part. The process then ends.

In some embodiments, obtaining a refractory fiber slurry includes heating an aqueous ceramic fiber slurry containing a body of ceramic fibers including about 50 weight percent to about 80 weight percent silica fibers and about 20 weight percent to about 50 weight percent alumina fibers.

In some embodiments, heating an aqueous ceramic fiber slurry includes heating the aqueous ceramic fiber slurry to boil off about 50 weight percent of water of the aqueous ceramic fiber slurry.

In some embodiments, adding a viscosity control additive to the slurry includes adding xanthan gum that has a weight between about 0.25 percent and about 2.5 percent of a weight of the binder and the body of ceramic fibers before the aqueous ceramic fiber slurry is heated.

In some embodiments, the method further comprises mixing isopropyl alcohol with the xanthan gum before the xanthan gum is added to the binder and the body of ceramic fibers.

In some embodiments, the method further comprises off-axis centrifugally mixing a mixture of the isopropyl alcohol, the xanthan gum, the binder, and the body of ceramic fibers for about 15 seconds to about 180 seconds. An off-axis centrifugal mixer is a type of mixer that is useful for mixing components with very different or very high viscosities, as is known.

In some embodiments, the method further comprises stir mixing the mixture of the isopropyl alcohol, the xanthan gum, the binder, and the body of ceramic fibers for about 0.25 hours to about 5.0 hours.

In some embodiments, the method further comprises removing the isopropyl alcohol after the mixture of the isopropyl alcohol, the xanthan gum, the binder, and the body of ceramic fibers has been stir mixed.

Figure 2:
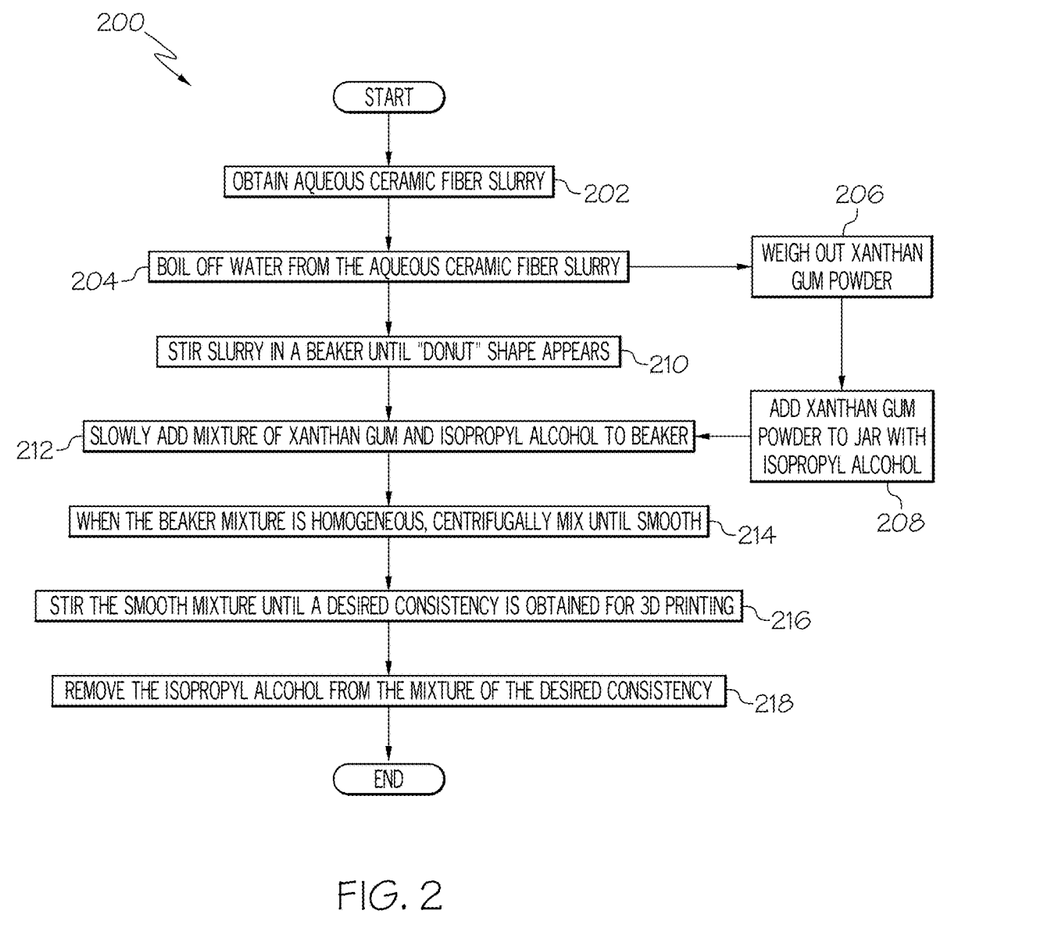
FIG. 2 is a flow diagram depicting a method of producing a ceramic precursor material in accordance with another example embodiment for additive manufacturing of a low-density, high-porosity ceramic part.

Referring to FIG. 2, flow diagram 200 depicts another example method of producing a precursor material for additive manufacturing of a low-density, high-porosity ceramic part in accordance with another embodiment. In block 202, an aqueous ceramic fiber slurry is obtained. The aqueous ceramic fiber slurry contains a body of ceramic fibers including about 50 weight percent to about 80 weight percent silica fibers and about 20 weight percent to about 50 weight percent alumina fibers. The process then proceeds to block 204. In block 204, the aqueous ceramic fiber slurry is heated to boil off about 50 weight percent of water of the aqueous ceramic fiber slurry. The process then proceeds to block 206, and in parallel at the same time to block 210.

In block 206, an amount of xanthan gum powder is weighed. In some embodiments, the added xanthan gum has a weight between about 0.25 percent and about 2.5 percent of a weight of the binder and the body of ceramic fibers before the aqueous ceramic fiber slurry is heated. The xanthan gum provides the slurry with a viscosity that is suitable for extrusion through a nozzle to manufacture a low-density, high-porosity ceramic part. The process proceeds to block 208.

In some embodiments as shown in block 208, isopropyl alcohol is mixed in a jar with the xanthan gum before the xanthan gum is added to the binder and the body of ceramic fibers. The isopropyl alcohol provides better mixing of the xanthan gum with the slurry.

At the same time blocks 206 and 208 are being processed, block 210 is processed in which the slurry from block 204 is stirred in a beaker until a "donut" shape appears. The process then proceeds from block 210 to block 212.

In block 212, the mixture of the xanthan gum and the isopropyl alcohol from block 208 is slowly added to the beaker containing the slurry from block 210. Then, in block 214, when the mixture in the beaker is homogeneous, the mixture is centrifuged until smooth. In some embodiments, the mixture of the isopropyl alcohol, the xanthan gum, the binder, and the body of ceramic fibers is off-axis centrifugally mixed for about 15 seconds to about 180 seconds. In some embodiments, the mixture of the isopropyl alcohol, the xanthan gum, the binder, and the body of ceramic fibers is centrifugally mixed for about 30 seconds. The process proceeds to block 216.

In block 216, the smooth mixture is stirred until a desired consistency is obtained for three-dimensional printing. In some embodiments, the mixture of the isopropyl alcohol, the xanthan gum, the binder, and the body of ceramic fibers is stir mixed for about 0.25 hours to about 5.0 hours. The process then proceeds to block 218 in which the isopropyl alcohol is removed from the mixture of desired consistency after the mixture of the isopropyl alcohol, the xanthan gum, the binder, and the body of ceramic fibers has been stir mixed. The process then ends.

A precursor material produced in accordance with above-described example embodiments is suitable for additive manufacturing of a low-density, high-porosity ceramic part. In some embodiments, the precursor material comprises a body of refractory fibers, a binder in admixture with the body of refractory fibers, and a viscosity control additive in admixture with the binder and the body of refractory fibers to provide an overall mixture with a viscosity between about 0.3 centipoise and about 150,000 centipoise. The overall mixture can be extruded through a nozzle to manufacture the low-density, high porosity ceramic part.

In some embodiments, the body of refractory fibers comprise a body of ceramic fibers including about 50 weight percent to about 80 weight percent silica fibers and about 20 weight percent to about 50 weight percent alumina fibers.

In some embodiments, the viscosity control additive comprises xanthan gum that has a weight between about 0.25 percent and about 2.5 percent of a weight of the binder and the body of ceramic fibers before mixing of the viscosity control additive with the binder and the body of ceramic fibers.

In some embodiments, the viscosity control additive comprises polyethylene glycol (PEG) that has a weight between about 0.25 percent and about 2.5 percent of a weight of the binder and the body of ceramic fibers before mixing of the viscosity control additive with the binder and the body of ceramic fibers. In some embodiments, the PEG has a number average molecular weight ($M_n$) ranging from about 2000 to about 10,000 in a ratio (PEG:slurry suspension) of about 1:5 by mass. In some embodiments, PEG with a $M_n$ of about 10,000 had a significant effect in which the settling time of the slurry suspension increased and the slurry suspension was kept uniform for a longer time.

In some embodiments, the viscosity control additive comprises polyethylene oxide (PEO) that has a weight between about 0.25 percent and about 2.5 percent of a weight of the binder and the body of ceramic fibers before mixing of the viscosity control additive with the binder and the body of ceramic fibers.

In some embodiments, the binder comprises a suitable binder material, such as a thermoplastic binder, for example. In some embodiments, the binder is a liquid. In some embodiments, the binder is a solid.

The following example illustrates a method of producing a ceramic precursor material in accordance with an embodiment. The example is intended to illustrate, but in no way limits, the scope of the invention.

EXAMPLE

An aqueous ceramic fiber slurry was obtained as a feedstock slurry. An example aqueous ceramic fiber slurry is disclosed in U.S. Pat. No. 6,716,782, assigned to The Boeing Company. Other aqueous ceramic fiber slurries that can be used as a feedstock slurry are possible.

The slurry was heated on a hot plate at 100° C. to boil off about 50% of the water by mass. The slurry was then placed into a beaker. Xanthan gum powder in the amount of about one percent of the mass of the slurry was weighed out. The weighed out xanthan gum powder was added to a jar with enough isopropyl alcohol to reach about one inch above the powder level. The jar was shaken by hand until the mixture of the xanthan gum and the isopropyl alcohol was well dispersed. The beaker of slurry was put into a benchtop shear stirrer, and the stirring speed was adjusted until a "donut" shape appeared. The stirring speed was in the range of about 1300 revolutions per minute (rpm) to about 1700 rpm.

The mixture of the xanthan gum and the isopropyl alcohol was then added slowly to the beaker while stirring. Isopropyl alcohol was added as needed to achieve good mixing. Once the mixture in the beaker was relatively homogeneous, it was centrifugally mixed for about 30 seconds at 2100 rpm until smooth. The mixture in the beaker was then put into a benchtop shear stirrer for about 0.5 hours until a good consistency for three-dimensional printing was obtained. The mixture in the beaker was then heated on a hot plate overnight at 80° C., stirring if needed, to remove the isopropyl alcohol. The last of the isopropyl alcohol was removed by placing the beaker in a vacuum oven until bubbling of the mixture in the beaker stopped. After the last of the isopropyl alcohol was removed, the ceramic precursor material was thereby produced. The ceramic precursor material produced could be shelved (as long as care is taken to account for water loss through evaporation) before having to be placed into a three-dimensional printer and extruded to manufacture a ceramic part.

When the ceramic precursor material produced was ready to be placed into a three-dimensional printer, the material was put into a benchtop stirrer for about an hour just right before printing to ensure a homogeneous mixture. The ceramic precursor material was then centrifugally mixed for about 30 seconds at about 2100 rpm for final smoothing before being placed into the three-dimensional printer.

In some embodiments, a density of the ceramic precursor material produced is between about four pounds per cubic foot (pcf) and about 25 pcf. In some embodiments, the density of the ceramic precursor material is about 17 pcf.

Figure 3:
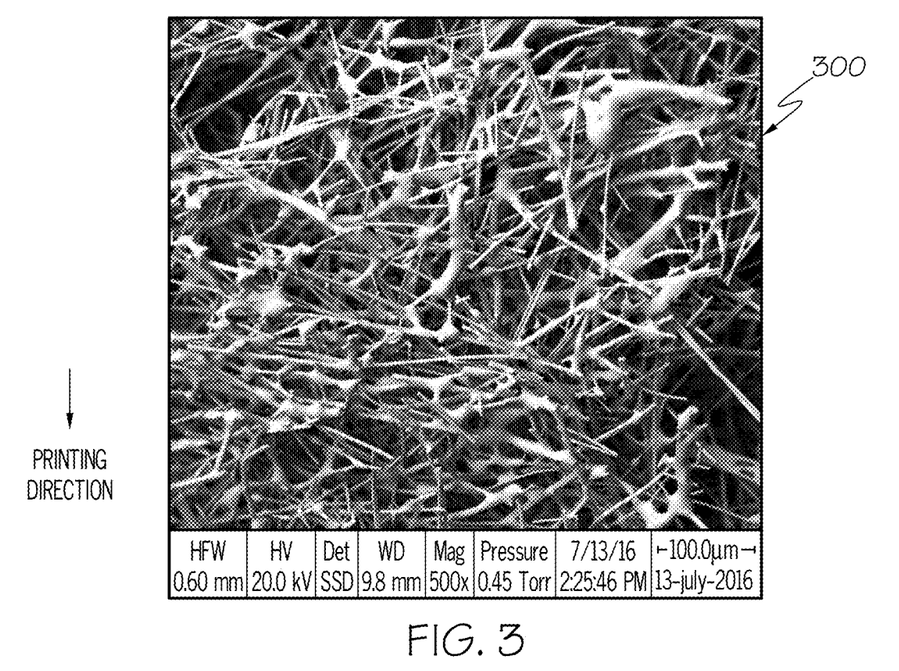
FIG. 3 is a micrograph of refractory fibers of a low-density, high-porosity ceramic part manufactured using a ceramic precursor material produced in accordance with an example embodiment.
Figure 4:
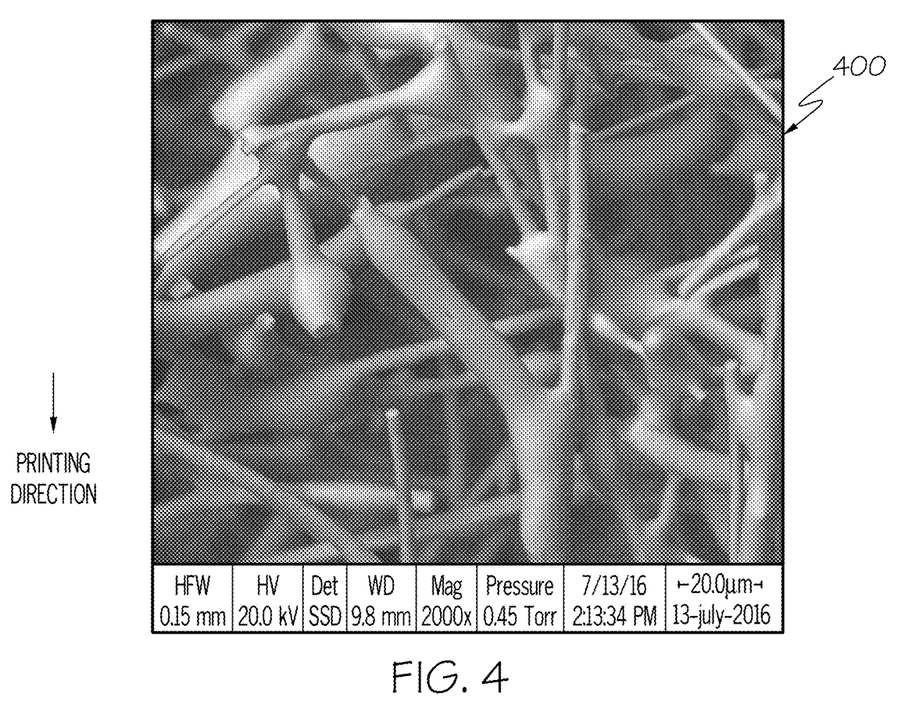
FIG. 4 is an enlarged portion of the micrograph of FIG. 3.
Figure 5:
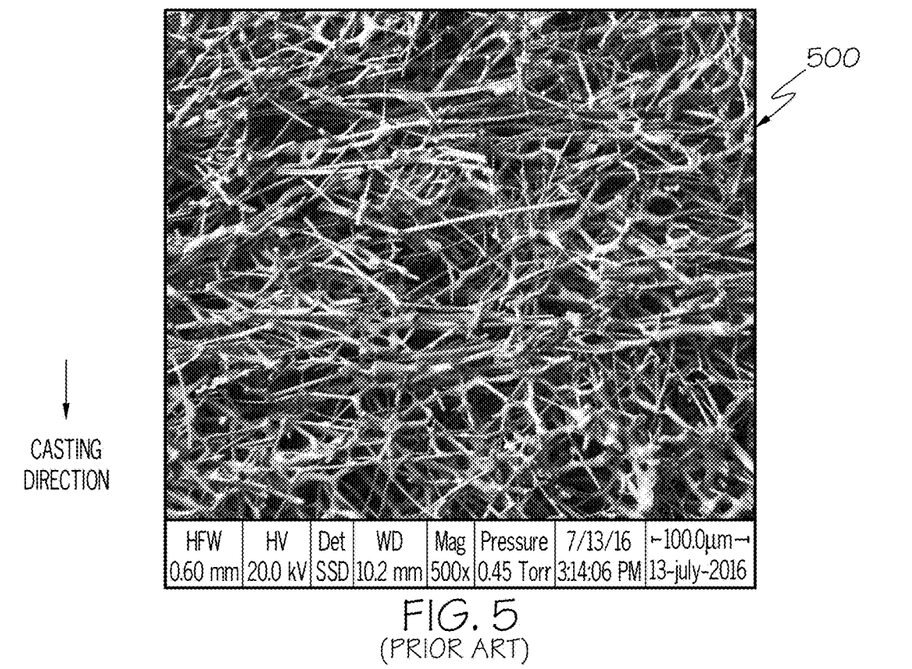
FIG. 5 is a micrograph of refractory fibers of a ceramic part manufactured using a known ceramic precursor material.
Figure 6:
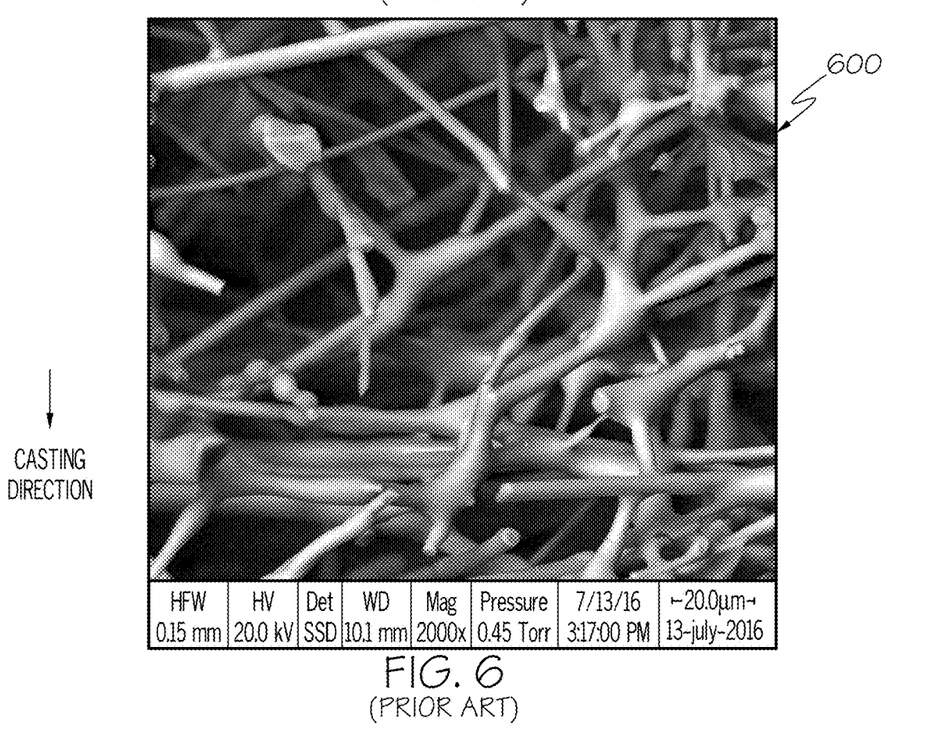
FIG. 6 is an enlarged portion of the micrograph of FIG. 5.

Referring to FIG. 3, a micrograph 300 of refractory fibers of a low-density, high-porosity ceramic part manufactured using a precursor material produced in accordance with an embodiment is illustrated. FIG. 4 is an enlarged portion 400 of the micrograph of FIG. 3. FIG. 5 is a micrograph 500 of refractory fibers of a ceramic part manufactured using a known ceramic precursor material. FIG. 6 is an enlarged portion 600 of the micrograph of FIG. 5.

Advantageous results of the above-described precursor material produced can be illustrated by comparing the fiber orientation of the manufactured ceramic part shown in FIGS. 3 and 4 with the fiber orientation of the prior art manufactured ceramic part shown in FIGS. 5 and 6. As best shown in FIG. 3, the majority of fibers are oriented normal to the printing direction (i.e., the casting direction). There are also "globs" (best shown in FIG. 4) with a high degree of bonding at the fiber-to-fiber junctions. The orientation of the ceramic or refractory fibers shown in FIGS. 3 and 4 have an identifiable pattern that can be observed under optical or scanning electron microscopy.

The precursor material produced in accordance with example embodiments described hereinabove can be used to manufacture any low-density, high-porosity ceramic part. In particular, the precursor material produced can be used to manufacture low-density, mechanically stable ceramic or refractory insulation panels with cooling features for high temperature applications.

Figure 7:
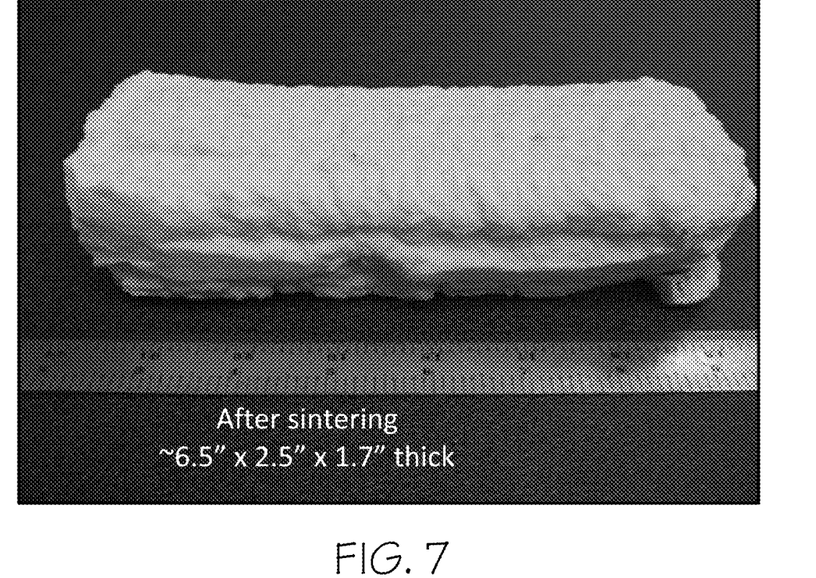
FIG. 7 is pictorial view of an example manufactured ceramic part after sintering.
Figure 8:
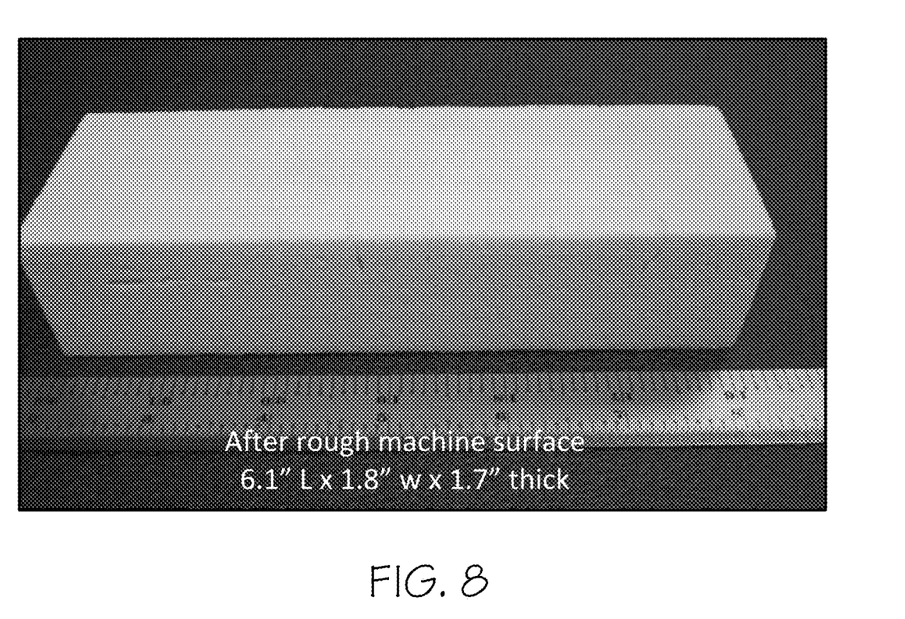
FIG. 8 is a pictorial view of the ceramic part of FIG. 7 after rough surface machining.

An example ceramic part manufactured using a ceramic precursor material produced in accordance with an example embodiment is illustrated in FIGS. 7 and 8. FIG. 7 shows the ceramic part after sintering. FIG. 8 shows the ceramic part of FIG. 7 after rough surface machining.

It should be apparent that the viscosity control additive provides a uniform slurry mixture, prevents mixture separation, and minimizes particle segregation during extrusion. The viscosity control additive also helps to form the desired porosity as well as to provide uniform distribution of porosity. In particular, the viscosity control additive improves rheological properties, such as viscosity or shear thinning, that are relevant to extrusion of the ceramic precursor material without interfering with sintering or degrading the ultimate material properties of the manufactured ceramic part.

More specifically, the viscosity control additive precisely controls the viscosity of the slurry mixture within a given range to provide a high viscosity to the precursor material to minimize running. The precursor material does not run once deposited onto a platform. The viscosity control additive also provides stability to the fibers in the precursor material to minimize clumping or settling.

The improved shear-thinning properties of the precursor material enable efficient and thorough mixing, and facilitate extrusion of the precursor material. The shear-thinning properties allow the precursor material to be extruded through a nozzle (such as in a three-dimensional printer) to create desired features. Homogeneity of fibers is maintained during extrusion. The precursor material also separates cleanly from the nozzle without "pulling" on material already deposited. Thus, the viscosity control additive acts as a thickening agent, and prevents particulate settling for extrusion through a nozzle.

It should also be apparent that the ceramic precursor material produced is in the form of heterogeneously mixed fibers in liquid that can be used in an additive manufacturing process to produce a near-net shape ceramic part. The heterogeneously mixed fibers in liquid can flow consistently through a nozzle of a three-dimensional printer for the purpose of free-form deposition in near-net shape. The additive manufacturing of a near-net shape ceramic part is a tool-less fabrication process that reduces touch labor and machining costs. This results in significantly reduced costs for machining and segment bonding to form the net shape. Thus, the result is less machining, less scrap, and reduced overall manufacturing costs.

Although the above description describes example ceramic precursor material and example methods for producing a ceramic precursor material for OEMs in accordance with military and space regulations, it is conceivable that the example ceramic precursor material and methods may be implemented in any industry in accordance with the applicable industry standards.

Although various aspects of disclosed embodiments have been shown and described, modifications may occur to those skilled in the art upon reading the specification. The present application includes such modifications and is limited only by the scope of the claims.

What is claimed is:

1. A precursor material for additive manufacturing of a low-density, high-porosity ceramic part, the precursor material comprising:
   a body of refractory fibers comprising a body of ceramic fibers including about 50 weight percent to about 80 weight percent silica fibers and about 20 weight percent to about 50 weight percent alumina fibers;
   a binder in admixture with the body of refractory fibers; and
   a viscosity control additive in admixture with the binder and the body of refractory fibers to provide an overall mixture with a viscosity between about 0.3 centipoise and about 150,000 centipoise.

2. The precursor material of claim 1 wherein the overall mixture can be extruded through a nozzle to manufacture the low-density, high porosity ceramic part.

3. The precursor material of claim 1 wherein the binder comprises a thermoplastic material.

4. The precursor material of claim 1 wherein the viscosity control additive comprises xanthan gum.

5. The precursor material of claim 1 wherein the viscosity control additive comprises polyethylene glycol.

6. The precursor material of claim 1 wherein the viscosity control additive comprises polyethylene oxide.

7. The precursor material of claim 1 having a density between about 4 pounds per cubic foot and about 25 pounds per cubic foot.

8. A three-dimensional printer comprising the precursor material of claim 1.

9. A method for manufacturing a ceramic part comprising:
   placing into a three-dimensional printer the precursor material of claim 1.

10. The precursor material of claim 4 wherein the xanthan gum comprises a weight between about 0.25 percent and about 2.5 percent of a weight of the binder and the body of ceramic fibers before mixing of the viscosity control additive with the binder and the body of ceramic fibers.

11. The precursor material of claim 5 wherein the polyethylene glycol comprises a weight between about 0.25 percent and about 2.5 percent of a weight of the binder and the body of ceramic fibers before mixing of the viscosity control additive with the binder and the body of ceramic fibers.

12. The precursor material of claim 6 wherein polyethylene oxide comprises a weight between about 0.25 percent and about 2.5 percent of a weight of the binder and the body of ceramic fibers before mixing of the viscosity control additive with the binder and the body of ceramic fibers.

13. A three-dimensional printer comprising:
   a nozzle; and
   a precursor material extrudable through the nozzle, the precursor material comprising:
      a body of refractory fibers comprising about 50 weight percent to about 80 weight percent silica fibers and about 20 weight percent to about 50 weight percent alumina fibers;
      a binder in admixture with the body of refractory fibers; and
      a viscosity control additive in admixture with the binder and the body of refractory fibers to provide an overall mixture with a viscosity between about 0.3 centipoise and about 150,000 centipoise.

14. The three-dimensional printer of claim 13 wherein the binder comprises a thermoplastic material.

15. The three-dimensional printer of claim 13 wherein the viscosity control additive comprises xanthan gum.

16. The three-dimensional printer of claim 13 wherein the viscosity control additive comprises polyethylene glycol.

17. The three-dimensional printer of claim 13 wherein the viscosity control additive comprises polyethylene oxide.

18. The three-dimensional printer of claim 13 wherein the precursor material has a density between about 4 pounds per cubic foot and about 25 pounds per cubic foot.

19. A method for manufacturing a precursor material for additive manufacturing, the method comprising:
   preparing a refractory fiber slurry comprising a binder and a body of ceramic fibers, the body of ceramic fibers comprising about 50 weight percent to about 80 weight percent silica fibers and about 20 weight percent to about 50 weight percent alumina fibers; and
   adding a viscosity control additive to the refractory fiber slurry to provide a slurry with a viscosity between about 0.3 centipoise and about 150,000 centipoise.

20. The method of claim 19 further comprising heating the refractory fiber slurry to remove water from the refractory fiber slurry.

* * * * *